3,054,424
LEVELLING DEVICE FOR PNEUMATIC SUSPENSION WITH FRONT CAM CONTROL MEMBER, PARTICULARLY FOR VEHICLES
Giuseppe Alfieri, Milan, Italy, assignor to Fabbrica Italiana Magneti Marelli S.p.A., Milan, Italy, a company of Italy
Filed Feb. 5, 1959, Ser. No. 791,417
Claims priority, application Italy Feb. 12, 1958
3 Claims. (Cl. 137—627.5)

The present invention relates to a device for the automatic adjustment of the pressure of a fluid contained in an elastic body subjected to a variable external load, and more particularly to a levelling device for pneumatic suspensions of vehicles comprising essentially two actuating sections each which is equipped with a push rod with a valve, connecting pieces for connection with a tank of compressed fluid and with the elastic elements and control members associated with said push rods and actuated in turn by an external lever sensitive to the variations of load.

In the application of the above type of device on vehicles, an external control lever is normally connected to a wheel axle of the vehicle while the levelling device proper is mounted on the frame. The elastic members or bellows of the suspension are accommodated between said frame and the wheel axle.

As a consequence, any variation of load on the vehicle determines a corresponding angular stroke of the above mentioned lever with consequent activation of the levelling device which by causing the feeding and the discharging of said bellows restores automatically the predetermined initial level conditions of the frame.

It is an object of the present invention to provide a particularly simple and durable levelling device possessing considerable sensitivity and safety in operation and affording moreover the widest possible range of movement of the external control lever.

According to the invention, push rods are provided for actuating the valves, the rods being controlled by a single member having a control face which defines two distinct planes parallel to each other, each at most of 180 degrees of development united along a diametral line, said control member being carried in rotation by a shaft connected to the external lever.

Figure 1:
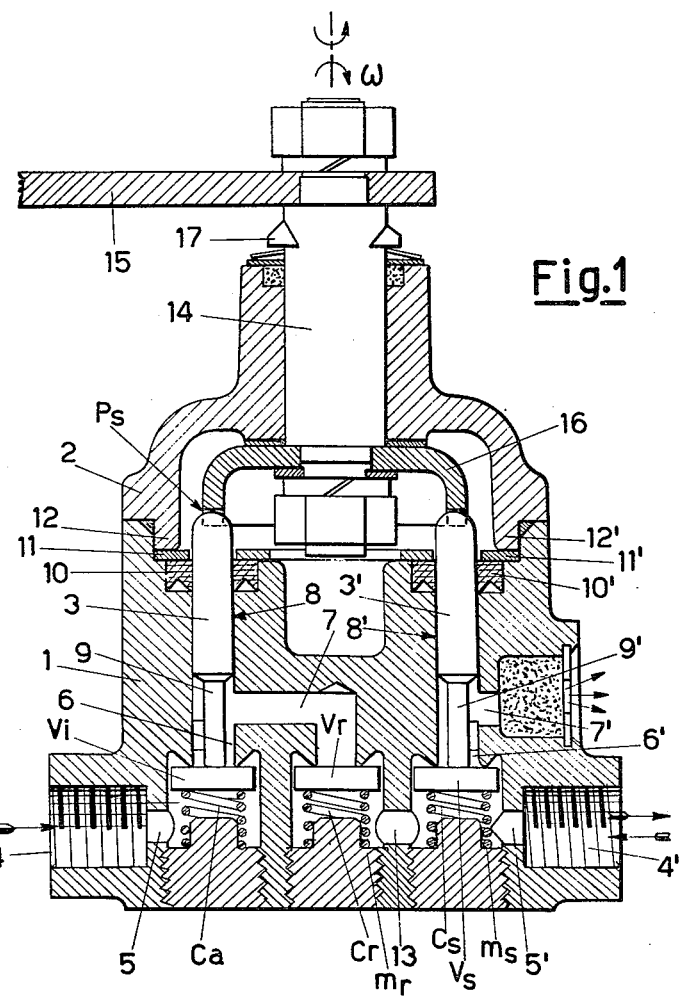
Figure 2:
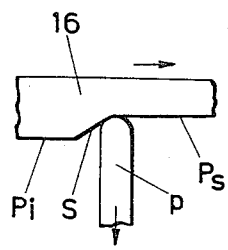

The invention will be further illustrated by way of example, with reference to the accompanying drawing wherein:

FIG. 1 is a longitudinal sectional view of the device along a plane passing through the axis of the push rods, and FIG. 2 is a side view of a section of the control member proper.

The device of FIG. 1 comprises essentially a body 1 wherein there are provided two actuating sections and a cover or lid 2 in which is mounted a rotary shaft supporting at its inner end the member for controlling the push rods.

The left hand section, which is the one that causes the feeding of the elastic elements, comprises essentially the push rod 3, the inlet valve $Vi$ controlled by said push rod and the connection 4 for connection with the compressed air tank (not shown) of the installation.

Said connection is in communication through the aperture 5 with the feeding chamber $Ca$ which in turn can be put into communication with the conduits 6 and 7 through the valve $Vi$.

The conduit 6 constitutes the lower portion of the recess or housing 8 wherein the push rod 3 slides. In order to enable passage of air through the recess, the lower end 9 of the push rod 3 has a somewhat reduced section as compared with the upper body.

In the rest condition of the levelling device, the end 9 does not displace the valve $Vi$ which is therefore closed by action of the return spring $m_a$ so that passage of air from $Ca$ to the conduit 7 is prevented. The push rod 3 slides in sealed relationship in the housing 8 due to the gasket 10 held in its seat by the positioning disc 11 which in turn is pressed by the annular end 12 of the lid 2 superimposed on the body 1. In the right-hand section there are substantially the same members as in the left hand section, namely, the push rod 3', the connection 4', the aperture 5', the conduits 6', 7' etc.

The section on the right of FIG. 1 is the discharge section, and hence conduit 7' is not an inlet as is conduit 7, but is instead a discharge for air to the outside (atmosphere).

It is clear however that air flows in conduit 7' only if the push rod 3' is shifted downwards to open the discharge valve $Vs$ which is between the chamber $Cs$ and the recess 6' in communication with conduit 7'.

Under such conditions the discharge takes place according to the circuit: connection 4'—aperture 5'—chamber $Cs$—conduits 6'—7'. Upon termination of the force acting upon the push rod 3' the spring $m_s$ returns the valve $Vs$ to its seat thereby interrupting the connection between connection 4' and conduit 7'.

In addition to the inlet and discharge valves the device comprises a retaining valve $Vr$ which is between the conduit 7 and the chamber $Cr$ in communication with $Cs$ through the aperture 13.

This valve $Vr$ opens only in the feeding stage due to a yielding of return spring $m_r$ under the pressure of the pneumatic medium on said valve $Vr$, in the conduit 7.

In the discharging stage, valve $Vr$ is closed which insures that the fluid will not flow back into the member designed for introduction.

In the lid 2, there is mounted a rotatable shaft 14 connected at one end rigidly to the external lever 15 and supporting at its inner end the control member 16.

The fastening of that member at the end of the shaft 14 is effected by any conventional method. The shaft 14 can slide in the cylindrical cavity provided in the hub of the lid 2 but it cannot move therein with translatory movement which is prevented by the projections or abutments 17 and by the member 16.

During the rotation of the shaft as caused by the external lever, member 16 acts upon the push rod 3 or upon rod 3' thereby activating the one or the other section but never contemporaneously.

The control member is constituted by a cup formed preferably by embossing. The face which controls the two push rods has two distinct planes each of about 180° (degrees) of development.

Said planes are staggered with respect to each other but are parallel, and the passage from one to the other takes place through a surface of suitable junction as indicated in FIG. 2 which represents in profile the section of the control member 16 at the point at which the two planes are connected. The lower plane $Pi$ is, more particularly, joined to the upper plane $Ps$ by means of the inclined surface S.

Consequently during the rotation of the member 16 the push rod initially in contact with $Ps$ and supported by the corresponding valve will be displaced in the direction of the arrow until its engaged end is displaced to the plane $Pi$.

The junction of the two planes is effected along a diametral line chosen in such a way that, in the rest condition of the levelling device, which position is represented in FIG. 1, the engaged ends of the two push rods are both in the upper plane $Ps$ while the lower ends of the push rods rest on the associated valve.

Hence, in the rest condition of the device, the two push rods are lifted and both valves which they control are closed. On occurrence of the actuation of the device following an oscillation of the lever 15, rotation in one direction or in the other direction of the member 16 produces the consequence that one of the two push rods is pushed downwards and is kept there by the lower plane P$i$ for a rotation of about 180 degrees, while the non-activated push rod will remain in its rest position supported between the associated valve and the upper plane P$s$.

This coupling system allows, as is obvious, the widest possibility of rotation of the control shaft of about 180 degrees of useful angle for introduction and an equal angle for discharge.

A further feature of the device consists in that it has the valve axis parallel to the axis of the shaft of rotation 14, which insures greater compactness for the whole.

Since it is possible to control the push rods for actuating the valves by means of a simple cup, it is possible to achieve constructive simplicity. During operation the rotation of the control shaft 14 (and, therefore, of the cup 16) in the clockwise direction ($\omega$) determines the opening of the inlet valve V$i$ while the rotation in the opposed direction determines the opening of the discharge valve V$s$.

In the first case the air of the tank passes through the connection 4, the chamber C$a$, the conduit 7, the valve V$r$, the chamber C$s$ and the connection 4' to feed the bellows of the supension; in the second case the air coming from the bellows discharges to the atmosphere through the chamber C$s$, the valve V$s$ and the conduits 6' and 7'.

The rotations of the shaft are caused by the lever 15 which oscillates in one direction or in the other direction according to whether there is a lowering (increase of load) or lifting (diminution of load) of the suspended portion of the vehicle as compared with the rigid portion (wheel axle).

What is claimed is:

1. A valve control for a vehicle levelling system, said valve control comprising: a body having an axis of symmetry, said body being provided with openings for the flow of a pneumatic pressure medium, one of said openings being adapted for connection to a source of a pneumatic pressure medium, a second opening being adapted for connection to the vehicle levelling system, a third opening being in communication with the atmosphere, three valve members in and controlling the passage of said medium through said openings, a plug threadably engaged in said body beneath each of said valves, the plugs being removable from the body in a manner independently of the openings in the body which permit the flow of the pneumatic pressure medium, elastic means on the plugs supporting the valves and urging the valves to closed position, a pair of push rods axially displaceable in said body for controlling the outer two of the valve members, said rods being parallel and equally spaced from said axis, the elastic means, valves and push rods being removable from said body with said plugs removed from said body, one of the outer two valve members being adapted to control the flow of pressure medium from the source opening into the body, the other of the outer valves being adapted to selectively control communication of the vehicle levelling system opening with the atmosphere, the middle valve member constituting a check valve member, said check valve member being opened by the pressure of the pneumatic medium, against the action of the elastic means, to establish communication between the source of opening and the vehicle levelling opening with the said other valve member closed, said other valve member being opened in response to displacement of the associated push rod to establish communication between the vehicle levelling opening and the atmosphere, said check valve member remaining closed with the said other valve member open to block flow of the pressure medium from said source opening to the atmosphere, and a rotatable member in said body, said rotatable member having an annular surface symmetrically disposed about said axis at a distance therefrom equal to that of said rods, said surface having two spaced levels each of substantially 180° circular extent, said levels being parallel to one another and perpendicular to said axis, said valve members being in a plane extending parallel to said levels and spaced therefrom, said rods being of a length to extend between and contact the valve members and the level of the surface which is furthest from the plane of the valve members, said rods both being engaged on the latter said level with said rotatable member in a first normal position and with said valve members being closed, only one of said rods at a time being engageable on the other of said levels, which is closer to said valve member, whereby to open the corresponding valve member, the other rod remaining between the said latter level and the corresponding valve member whereby the latter remains closed, said rods contacting the respective levels of the surface substantially for an angle of rotation of 180° of said rotatable member.

2. A valve control as claimed in claim 1 comprising a sharply inclined portion connecting said levels.

3. A valve control as claimed in claim 2 wherein said rods are on the said latter level adjacent the sharply inclined portion in said first normal position so that relatively small rotation of said rotatable member enables one of the rods to engage the other said level.

References Cited in the file of this patent

UNITED STATES PATENTS

| | | |
|---|---|---|
| 618,227 | Hawes | Jan. 24, 1899 |
| 1,095,003 | Leonard | Apr. 28, 1914 |
| 2,490,311 | Rostu | Dec. 6, 1949 |
| 2,670,201 | Rossman | Feb. 23, 1954 |